United States Patent [19]

Frascone

[11] Patent Number: 5,058,314
[45] Date of Patent: Oct. 22, 1991

[54] FOLDING ADHESIVE INSECT CATCHER

[76] Inventor: Gerald L. Frascone, 3125 182nd Ave. N.E., Wyoming, Minn. 55092

[21] Appl. No.: 495,844

[22] Filed: Mar. 19, 1990

[51] Int. Cl.$^5$ .............................................. A01M 3/04
[52] U.S. Cl. ............................................ 43/136; 43/137
[58] Field of Search ................................... 43/136, 137

[56] References Cited

U.S. PATENT DOCUMENTS

| | | | |
|---|---|---|---|
| 382,580 | 5/1988 | Wilmot et al. | 43/136 |
| 834,039 | 10/1906 | Bailey | 43/136 |
| 884,213 | 4/1908 | Schmidt | 43/136 |
| 1,005,443 | 10/1911 | Luckett | 43/136 |
| 1,083,179 | 12/1913 | Armstrong | 43/136 |
| 1,102,829 | 7/1914 | Walker | 43/136 |
| 1,195,986 | 8/1916 | Harrison | 43/136 |
| 1,706,516 | 3/1929 | Bennett | 43/137 |
| 1,802,774 | 4/1931 | Nixon | 43/136 |
| 2,618,882 | 11/1952 | Martin | 43/136 |
| 3,449,856 | 6/1969 | Weaver | 43/136 |
| 4,653,222 | 3/1987 | Viscosi | 43/137 |
| 4,759,150 | 7/1988 | Pierce | 43/136/137 |
| 4,787,171 | 11/1988 | Dagenais | 43/137 |

Primary Examiner—Kurt Rowan

[57] ABSTRACT

A one piece fly or insect catcher 10 with a head portion 13 and a handle 12a, 12b protruding from each of the two outer edges. Adhesive 24 is disposed on the two inside surfaces 16a, 16b of the head portion 13. The insect catcher 10 is a folding unit 10 to enable a dual use. When the unit 10 is in the closed position it can be used for swatting insects 20 or for setting the unit 10 on any surface without the adhesive 24 adhering. In the open position it can be used to catch and retain swarming 20 in flight when waved as an ordinary fan.

1 Claim, 1 Drawing Sheet

FOLDING ADHESIVE INSECT CATCHER

BACKGROUND

1. Field of the Invention

The invention resides in the field of fly or insect catchers. It more particularly relates to those implements having a sticky or adhesive surface to which the insect adheres.

2. Description of the Prior Art

The damage caused to the environment by chemical insecticides is sometimes greater than the total benefit obtained through their use. Thus the search has continued for economical, effective, specific, convenient and non-hazardous methods to control insects.

Numerous insect catching devices have been provided in prior art that are adapted to catch and retain insects in flight. For example U.S. Pat. Nos. 382,580 to Wilmot (1888); 834,039 to Bailey (1906); 884,213 to Schmidt (1908); 1,005,443 to Luckett (1911); 1,083,179 to Armstrong (1913); 1,802,774 to Nixon (1931); 3,449,856 to Weaver (1966) and 4,759,150 to Pierce (1988) are all illustrative of such prior art. While these units may be suitable for the particular purpose to which they address, they would not be as suitable for the purposes of the present invention as heretofore described.

OBJECTS AND ADVANTAGES

The present invention eliminates the need or use of replaceable parts, such as seperate adhesive parts. In this way, these previous inventions are inconvenient to use. The disadvantage of the prior art is that pieces have to be removed to be disposed. The fold over construction will be more fully understood from the drawings and description of the preferred embodiment which follow.

REFERENCE NUMERALS IN DRAWINGS

Figure 1:
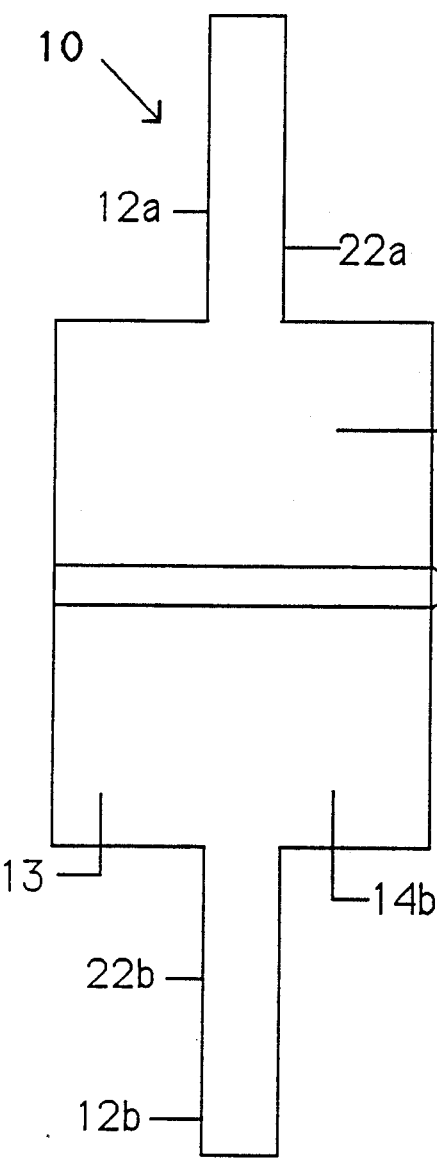
FIG. 1 is a front view of the preferred embodiment in the unfolded position

10: preferred embodiment
12a: handle portion
12b: handle portion
13: enlarged head portion
14a: outside (non stick) surface
14b: outside (non stick) surface
16a: inside (sticky) surface
16b: inside (sticky) surface
18: fold lines
20: insect
22a: means of connection
22b: means of connection
24: adhesive

DETAILED DESCRIPTION OF THE PREFERED EMBODIMENT

Figure 2:
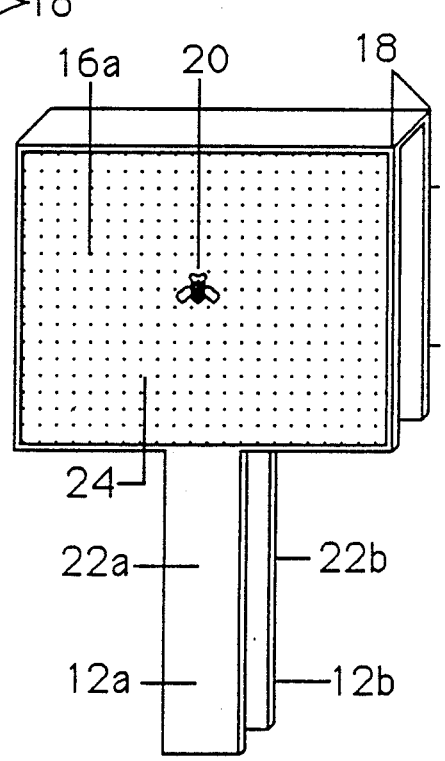
FIG. 2 is a perspective view of the preferred embodiment in the folded position for use.
Figure 3:
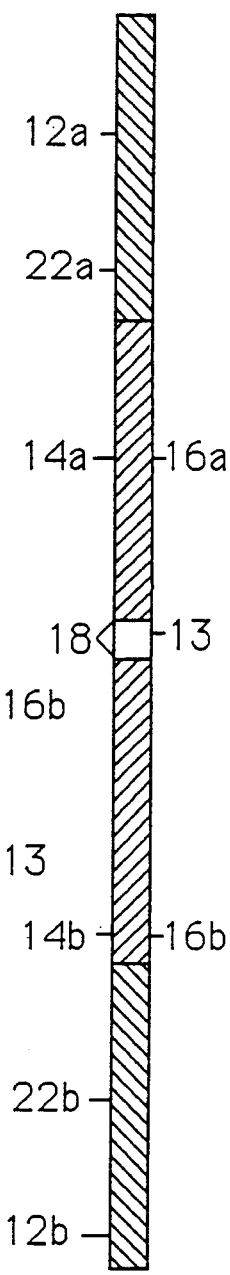
FIG. 3 is a side view of the embodiment of FIG. 1

Turning now descriptively to the drawings, in which similar reference characters denote similar elements throughout the several views, FIGS. 1,2 and 3 illustrate an insect catcher 10 of unitary construction that consists of handles 12a, 12b located at ends of head member portion 13.

On inside surface 16 an adhesive or sticky substance 24 is spread on both inside surfaces 16a, 16b. Handles 12a, 12b will have a connection 22a, 22b to hold handles 12a, 12b together. Entire unit 10 will have two fold lines 18 so when unit 10 is in a closed position for swatting or for catching insects 20, surfaces 14a, 14b; 16a, 16b generally will not touch.

Entire unit 10 is a one piece construction which folds 18 in the center of enlarged head portion 13. Preferred embodiment 10 in FIG. 3 shows a side view to which adhesive 24 may be applied to inside surfaces 16a, 16b. Once applied, adhesive 24 does not need to be removed.

Preferred embodiment 10 is then folded at two fold lines 18 to expose adhesive surfaces 16a, 16b. When in the folded position, handles 12a, 12b connect 22a, 22b. Unit 10 is then waved to catch and retain swarming insects 20.

For swatting insects 20 and setting preferred embodiment 10 on any surface, unit 10 can be unconnected 22a, 22b and folded over and reconnected 12a, 12b. Thus, leaving outside(non stick) surfaces 14a, 14b exposed.

A second choice of the folding design would be to have handles 12a, 12b in the center protruding to two enlarged head member portions 13 at both ends, whereby having fold lines 18 in the center of said handles 12a, 12b.

SUMMARY OF THE INVENTION

A primary object of the invention is to provide an insect catcher that will overcome the shortcomings of the prior art devices. This invention is a single unit of construction used to catch and retain swarming insects about the head and body of the user.

Another primary object of the invention is to have a convenient and inexpensive method of capturing and retaining insects, and thus disposing of the entire unit. The handle and head member are a one piece construction made of a lightweight substance that may be biodegradable. The adhesive recommended for use is a non-toxic substance.

The Adhesive is spread across the two inside surfaces when the unit is closed. By folding the handles completely over, the adhesive will then be on the two outer surfaces. The handles will connect to give the preferred embodiment the support that is necessary when opened or closed. When the unit is closed, it can be used as an ordinary fan. In this position, it can be set on a table or surface without leaving any of the sticky residue behind. It can also be used as a swatter in this manner. When the unit is open, it is to be used as an ordinary fan to capture and retain swarming insects.

While may above description contains many specificities, these should not be construed as limitations on the scope of the invention, but rather as an exemplification of one preferred embodiment thereof. Many other variations are possible. For example, the shape of the invention can be in any representative form. It can be round, square, rectangular and any shape, size or color so desired for aesthetic or functional purposes(including perforated or not).

Accordingly, the scope of the invention should be determined not by the embodiment(s) illustrated, but by the appended claims and their legal equivalents.

What is claimed is:

1. An insect catcher comprising, a head portion having two handle portions extending perpendicularly from said head portion, said handle portions forming a longitudinal axis, said head portion having a coating of adhesive material on one side, said head portion having two fold lines substantially at the center of said head portion perpendicular to said longitudinal axis, whereby said head portion maybe folded in half along said fold lines with said handle portions overlapping such that said coating forms an insect trapping surface.

* * * * *